United States Patent
Moore et al.

(10) Patent No.: US 11,750,561 B2
(45) Date of Patent: *Sep. 5, 2023

(54) METHOD AND APPARATUS FOR PROVIDING SECURE INTERNAL DIRECTORY SERVICE FOR HOSTED SERVICES

(71) Applicant: Centrify Corporation, Santa Clara, CA (US)

(72) Inventors: Paul Moore, Mercer Island, WA (US); Nathaniel Wayne Yocom, North Bend, WA (US)

(73) Assignee: DELINEA INC., Redwood City, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 17/036,286

(22) Filed: Sep. 29, 2020

(65) Prior Publication Data
US 2021/0029090 A1 Jan. 28, 2021

Related U.S. Application Data

(63) Continuation of application No. 13/765,616, filed on Feb. 12, 2013, now Pat. No. 10,798,057.

(51) Int. Cl.
*H04L 29/06* (2006.01)
*G06F 16/2455* (2019.01)
(Continued)

(52) U.S. Cl.
CPC .............. *H04L 63/02* (2013.01); *G06F 9/547* (2013.01); *G06F 16/2455* (2019.01);
(Continued)

(58) Field of Classification Search
CPC ......... H04L 63/02; H04L 61/45; H04L 61/59; H04L 63/0281; H04L 63/0823; G06F 16/2455; G06F 9/547
See application file for complete search history.

(56) References Cited

U.S. PATENT DOCUMENTS 7,376,827 B1 * 5/2008 Jiao .................. H04L 63/164
713/153
9,509,684 B1 11/2016 Dixson-Boles et al.
(Continued)

FOREIGN PATENT DOCUMENTS

CN 102567341 A * 7/2012
WO WO-02052439 A1 * 7/2002 ....... H04L 29/12132

OTHER PUBLICATIONS

InnovationQ Plus—IP.com (Year: 2023).*
(Continued)

*Primary Examiner* — Yin Chen Shaw
*Assistant Examiner* — Richard W Cruz-Franqui
(74) *Attorney, Agent, or Firm* — WOMBLE BOND DICKINSON (US) LLP

(57) ABSTRACT

A system and method for providing secure access to an organization's internal directory service from external hosted services. The system includes a remote directory service configured to accept directory service queries from an application running on hosted services. The remote directory service passes the queries to a directory service proxy server inside a firewall of the organization via a secure connection service. The directory service proxy server passes the queries to the internal directory service inside said firewall. Request responses from the internal directory service pass through the directory service proxy server to the remote directory service through said firewall via the secure connection service. The remote directory service returns the response to the requesting application.

11 Claims, 2 Drawing Sheets

(51) Int. Cl.
*G06F 9/54* (2006.01)
*H04L 9/40* (2022.01)
*H04L 61/45* (2022.01)
*H04L 61/59* (2022.01)

(52) U.S. Cl.
CPC .............. *H04L 61/45* (2022.05); *H04L 61/59* (2022.05); *H04L 63/0281* (2013.01); *H04L 63/0823* (2013.01)

(56) References Cited

U.S. PATENT DOCUMENTS

| | | |
|---|---|---|
| 2002/0019857 A1 | 2/2002 | Harjanto |
| 2003/0172127 A1 | 9/2003 | Northrup et al. |
| 2005/0257072 A1 | 11/2005 | Cross et al. |
| 2005/0278384 A1* | 12/2005 | Lin .................... H04L 61/4505 |
| 2005/0278646 A1 | 12/2005 | Liscano et al. |
| 2005/0289085 A1 | 12/2005 | Hamber |
| 2007/0115940 A1* | 5/2007 | Kamen ................. H04L 67/142 |
| | | 370/352 |
| 2007/0136803 A1 | 6/2007 | Ashoff et al. |
| 2012/0216108 A1 | 8/2012 | Yambal et al. |
| 2013/0067548 A1 | 3/2013 | McCray et al. |
| 2013/0084010 A1 | 4/2013 | Ross et al. |
| 2013/0219176 A1* | 8/2013 | Akella ................. G06F 16/185 |
| | | 713/165 |
| 2014/0230042 A1 | 8/2014 | Moore |

OTHER PUBLICATIONS

Mahajan, Vikas, "Should I Use a Directory, a Database, or Both?", Novell AppNotes, Available Online at <https://support.novell.com/techcenter/articles/ana20011101.html>, Nov. 1, 2001.
Microsoft, "What is a Directory Service?", Available Online at <https://msdn.microsoft.com/en-us/library/Aa367035(v=VS.85).aspx>, Retrieved on Aug. 14, 2015.
NPL Search, Google Scholar, 2020.

* cited by examiner

METHOD AND APPARATUS FOR PROVIDING SECURE INTERNAL DIRECTORY SERVICE FOR HOSTED SERVICES

BRIEF DESCRIPTION OF THE INVENTION

Embodiments of this invention provide secure access to an organization's internal directory service from external hosted services located on the Internet. An embodiment of this invention allows an application running outside the organization's network firewalls to use the organization's internal directory service for authenticating and authorizing user accounts. Embodiments of this invention do not require duplicating the directory service outside of the organization's internal network, nor do they require special incoming connections through the organization's firewall, both of which are difficult to set up and can compromise security.

BACKGROUND

Enterprises and other organizations are moving more of their internal network activities to hosted services outside their internal networks. Hosted services provide underlying hardware and support for applications, web sites, content distribution, and more under the care of a hosting business. Organization members/employees can use hosted services to perform work outside of the organization's internal-network premises.

As an organization's network activities migrate outside of its internal network, those activities often require access to the organization's internal directory service to authenticate and authorize users.

Hosted services do not currently have access to an organization's internal directory service. To provide authentication and authorization, hosted services may set up their own directory service in the same hosted environment. That directory service may have its own set of user and computer records, or it may duplicate the records stored in the organization's internal directory service.

Maintaining a separate external directory service in a hosted services environment has a serious problem: the external hosted directory service is separate from an organization's own internal directory service. The hosted service must create and maintain its own set of user and computer records.

The hosted directory service can create records one at a time as users and computers sign up for hosted services and create new accounts. If so, the hosted directory service is completely independent of the internal directory service. The organization's users may have completely different account names, passwords, and rights on hosted services than they do within the organization's internal network.

None of the comprehensive and carefully created user and computer accounts from the internal directory service apply to externally hosted services. Users must remember completely different account names and passwords for hosted services and internal network services. Authorizations defined within the internal directory service cannot apply to hosted services.

To provide access to internal records, the hosted directory service may create a copy of the internal directory service's records in the hosted environment and then use those records for authentication and authorization. This has two major problems:

a) The records now reside on a platform outside the security of the organization's own network firewalls where they might be read and altered by unauthorized individuals, posing a substantial security risk.

b) The hosted records must be constantly synchronized with the internal records to be effective. Any changes in the hosted directory service must be written to the internal directory service and vice versa. Complex mechanisms are necessary to make sure that the hosted and internal directory services do not try to change the same record simultaneously.

FIG. 1 shows hosted and internal directory services as they exist in the prior art wherein applications on hosted services use an external hosted directory service for authentication and authorization. The hosted directory service may or may not be a synchronized copy of an organization's internal directory service.

SUMMARY OF THE INVENTION

Embodiments of the invention eliminate the need for an external hosted directory service by replacing it with a secure direct connection to an organization's internal directory service located behind the organization's firewall. An embodiment of the invention requires very little setup by an organization, and the organization's internal services are not exposed to direct public access.

An embodiment of the invention stands between these two existing components:

a) An internal directory service which is an organization's directory service running behind a firewall inside the organization's internal network. A typical example is Microsoft Active Directory, but it may also be another type of directory service.

b) An application which is a computer process (typically a web application) that runs on hosted services and makes use of directory service. The application may use the directory service for user log-ons, for checking a user's permissions, or for other typical directory service information. Multiple applications on hosted services may request directory service.

An embodiment of the invention has as one component a remote directory service that resides on hosted services.

A remote directory service is a process that accepts queries from applications for directory service and passes those queries on to directory service proxy servers located in organizations' internal networks. The remote directory service manages connections with directory service proxy servers and determines which directory service proxy server to contact with a query.

An embodiment of the invention uses this existing component that provides a connection between hosted services and an organization's internal network:

A rendezvous service which is an internet service that provides a secure connection between the remote directory service in hosted services and directory service proxy servers within organizations' internal networks so that the two sides can exchange data with each other. These components contact the rendezvous service; the rendezvous service does not contact any component. The rendezvous service is typically provided by a commercial internet service vendor. An example is the service bus provided by Microsoft Azure.

An embodiment of the invention has as one component a directory service proxy server that resides within an organization's internal network.

A directory service proxy server is an application that communicates via the rendezvous service with the remote directory service. The proxy server receives requests from the remote directory service. It communicates directly with the internal directory service, passing on directory service requests, receiving responses from the service, and passing those responses back to the remote directory service via the rendezvous service.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF THE INVENTION

Figure 1:
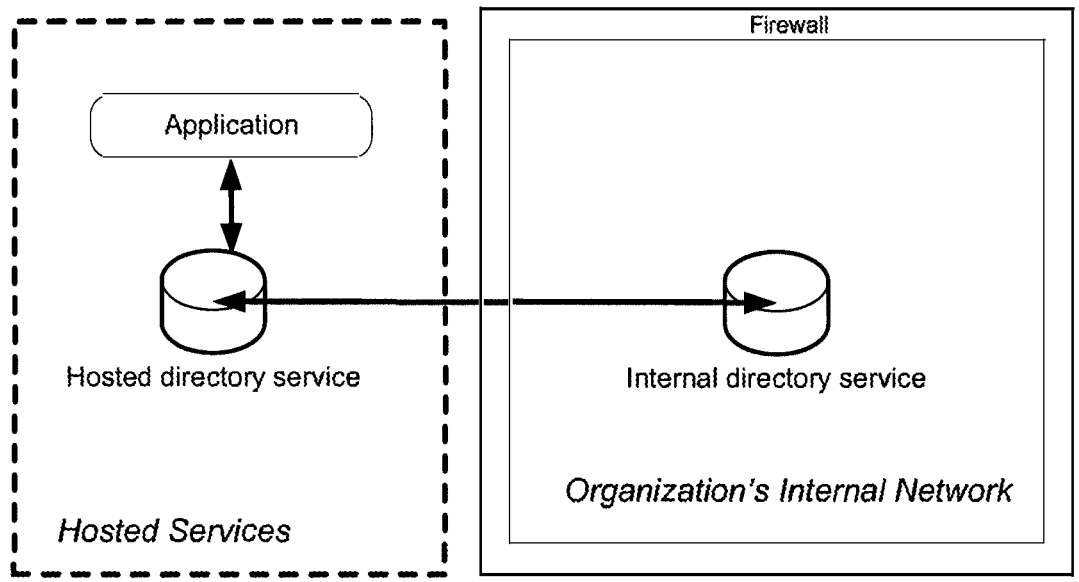
FIG. 1 shows hosted and internal directory services as they exist in the prior art.

The invention performs its functions using several primary mechanisms.

Secure Directory Service Connections without Allowing Inbound Connections

To provide secure connections from external hosted services to an organization's secure internal directory service, the invention links a directory service proxy server within the organization's internal network with a remote directory service running externally on hosted services. To ensure trust between the two components, the human who installs the directory service proxy server in the internal network initiates the proxy server's first contact with the remote directory service via a rendezvous service. During that first contact, the two components exchange security certificates with each other. The certificates authoritatively identify the components to each other in subsequent connections.

The directory service proxy server and remote directory service communicate with each other via a secure connection, a rendezvous server that uses well-known security mechanisms such as polling and long reads. This method of communication allows a secure connection between components behind an organization's firewall and components outside the firewall without setting up a dedicated computer in the organization's firewall or accepting any inbound connections from external components.

Secure Directory Service Access for Hosted Applications

Hosted applications receive internal directory service through a chain of components. Within hosted services, an application makes requests of the remote directory service, which connects through the rendezvous service to components behind an organization's firewall: the directory service proxy server and the directory service itself. Each of these connections has appropriate security. They are not public connections, and occur between components running on the same platform. The components will only connect with known and valid security certificates.

As an added level of security, the remote directory service may define an API that provides a non-destructive subset of internal directory services. The API does not, for example, include calls that remove records from the directory service. This limits the damage that a malicious application might do. The details regarding such API are not important for a proper understanding of the invention, and, therefore are not further described herein.

Preferably, the directory service proxy server provides an additional level of security: it responds only to requests that provide a valid certificate issued by the remote directory service to approved applications. When an application requests service, it must provide the certificate along with a key that specifies that the certificate can be used for a proxy call. The directory service proxy server denies any service request without the appropriate certificate and key.

Multi-Tenancy

The invention may serve multiple organizations from its location in hosted services. The remote directory service in hosted services has connections to multiple directory service proxy servers located within different organizations' internal networks. The invention accepts directory service requests for any connected proxy, sorts them out to go to the proper proxy, and ensures complete separation of directory service for different proxies. In other words, it provides multi-tenanted directory service: each directory service proxy is a tenant, and requests and data exchange never occur across tenants.

When a directory service proxy server is first installed in an internal network, the human installing it first connects it to a local directory service and then connects the proxy server for the first time to the remote directory service. The remote directory service assigns a unique human-memorable ID for the proxy server. This ID is called the proxy ID.

An organization may set up multiple directory service proxy servers for a single directory service to provide redundant proxy servers for load sharing or failover. If so, these proxy servers get the same proxy ID because they connect to the same service.

When an application wants directory service, it specifies the proxy ID of the tenant it wants to query. The application uses the ID in its query to the remote directory service.

The remote directory service reads the ID, determines which directory service proxy server to contact through the rendezvous service, and passes the request on to that directory service proxy server to handle. The proxy's response goes back to the remote directory service and then directly back to the requesting application in response to the original request.

Implementation Details

Figure 2:
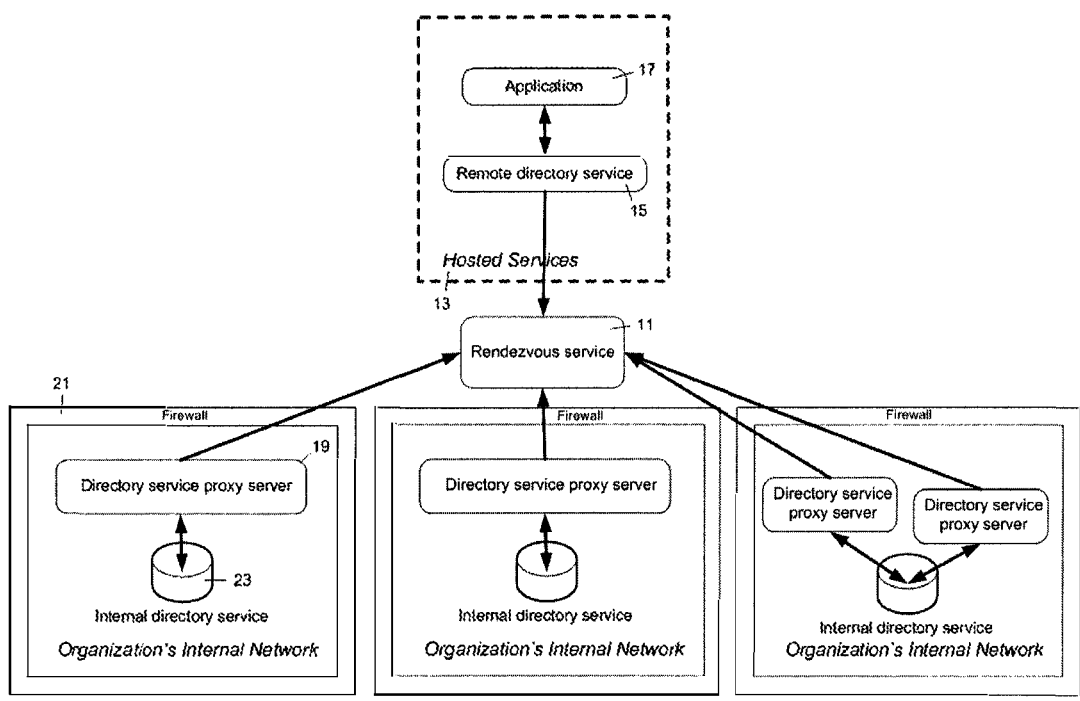
FIG. 2 is a block diagram showing the elements of the invention and their connections to each other and existing elements.

Referring now to FIG. 2, the invention is implemented to allow a remote directory service 15 in one hosted services environment to communicate with one or more directory service proxy servers 19. Each proxy server is an independent tenant. A directory request goes to a single tenant. Data exchange does not cross tenants.

The Hosting Service and Rendezvous Service

The invention components that are external to the organization's internal network run on hosted services 13 such as Microsoft Azure. Azure is a hosting service provided by Microsoft that provides underlying service hardware and a service development environment.

The Azure service bus in one embodiment is a rendezvous service 11. It is a standard feature offered by Azure. The invention uses service buses to connect the remote directory service 15 on hosted services to directory service proxy servers 19 in an organization's internal networks. The service buses provide the secure connections described earlier as part of the invention. No changes are required to be made to existing hosted services such as Microsoft Azure to enable them to be used with the present invention.

The rendezvous service is only one possible mechanism that might be used by the invention to connect the remote directory service 15 to a directory service proxy server 19. Any secure connection such as a virtual private network (VPN) connection would work as well, although it might require more setup than a rendezvous service 11.

The Application

The application 17 that uses the invention runs on hosted services 13 where the invention is located and has access to the remote directory service 15 to make directory service requests. This application is not part of the invention, and can be any application running on hosted services with access to the remote directory service. The application must provide a directory proxy ID to identify which internal directory service it wants to use, it must provide a valid certificate and key, and it must know the directory query syntax to use to make requests of the directory service.

One example of a hosted application that uses the invention is a mobile device enrollment application. The enrollment application allows a device owner to register the device with an organization. The user connects the device to the enrollment application and provides a user name, a password, and the directory proxy ID of the organization with which the device should be enrolled. The enrollment application then contacts the directory service interface, requests authentication with the user name and password, and provides the directory proxy ID along with a valid certificate and key.

When the invention has used its components and connections to get authentication through the internal directory service, the invention reports the success or failure of the authentication through the directory service interface back to the requesting application. The application has no knowledge of how the authentication took place; it simply requested authentication from the remote directory service and got that authentication.

A hosted application may make any number of directory service queries to the remote directory service as long as the process understands the query. Applications are not restricted solely to authentication queries, but may make any number of directory service queries. Although the description provided herein focuses on authentication queries, the same mechanisms are used for other types of directory service queries. Examples of such other directory service queries include, without limitation adding a user to a group, checking group membership among many others. However, the mechanism used for handling queries as described herein is the same. However, as noted above, the remote directory service may define an API that provides a non-destructive subset of internal directory services so as to, for example, prohibit calls that remove records from the directory service, or any other activity that may damage the directory.

The Remote Directory Service

The remote directory service 15 provides a directory service interface that accepts directory service queries and passes them on to the directory service proxy server within an organization's internal network. The remote directory service manages connections with directory service proxies on customers' premises (through the rendezvous service), assigns proxy IDs to registering directory service proxies, determines to which proxies queries should go, and so on.

The Directory Service Proxy Server

The application 17 preferably installs one or more directory service proxy servers 19 within an organization's internal network, that is, behind a firewall 21 which normally blocks inbound network traffic. A directory service proxy server is an application that in one embodiment runs in the Windows Server environment.

The directory service proxy server 19 handles the connection with the Azure service bus (rendezvous service 11) to the remote directory service 15. It also has direct contact with the organization's directory service 23 which in one embodiment is Microsoft's Active Directory. The directory service proxy server can present queries to directory service 23 and receive responses.

Handling an Application's Directory Service Request

Figure 3:
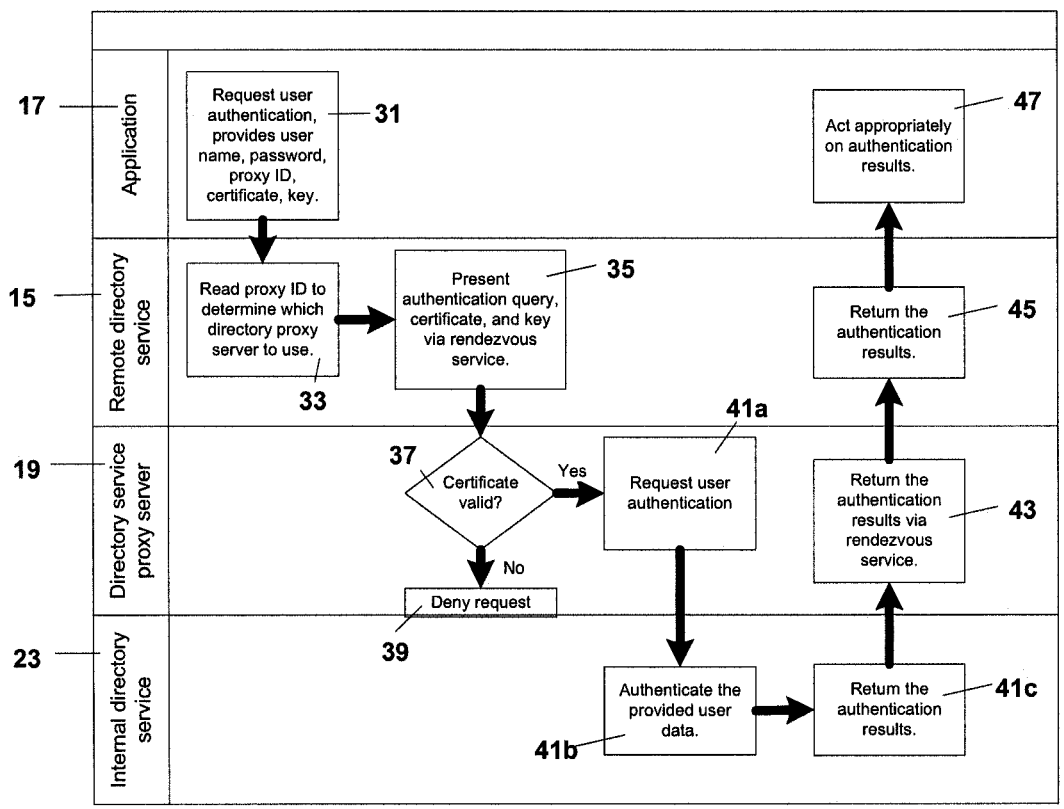
FIG. 3 is a flowchart that shows the processing performed by the invention's components to handle an authentication request from a hosted application.

FIG. 3 illustrates the process that occurs when a hosted application 17 requests directory service of the invention through the remote directory service 15.

The hosted application 17 requests 31 authentication from the remote directory service 15. The application 17 uses the request format defined by the remote directory service's 19 API. The application 17 provides a user name, a password, a proxy ID to identify the directory service proxy server 19 to use to provide directory service, and a valid certificate and key for that directory service proxy server 19. To application 17, remote directory service 15 appears to be a prior art hosted directory service of the type described with reference to FIG. 1.

When the remote directory service 15 receives the authentication query from the hosted application 17, the remote directory service 15 reads and uses 33 the proxy ID to determine the appropriate directory service proxy server 19 to receive the query, then uses the rendezvous service 11 to contact 35 that directory service proxy server 19 and present the query. The directory service proxy server 19 checks 37 the provided certificate and key to ensure that the request comes from a valid application and rejects 39 the request if the certificate is not valid.

The directory service proxy server queries 41a the internal directory service 23 to authenticate 41b the provided user data, receives a response 41c from the internal directory service 23 with authentication success or failure, then passes 43 that response back to the remote directory service 15 via the rendezvous service 11. The remote directory service 15 passes 45 the response on to the hosted application 17 which then acts 47 according to the provided results.

Further details regarding application 17, rendezvous service 11, firewall 21 and internal directory service 25 are not set forth herein as such elements are well known in the art and while necessary for complete operation of the invention do not need to be modified for use with the invention.

The invention claimed is:

1. A system for providing secure access to an organization's internal directory service from external hosted services comprising:

a memory having instructions executed by a processor to implement:
a) a remote directory service configured to accept directory service queries from an application running on said external hosted services, wherein said queries are for directory services which are offered by said internal directory service, said internal directory service being provided within a firewall of said organization, wherein said remote directory service is further configured to accept a validation protocol from said application, said validation protocol provided by a directory service proxy server within said firewall;
b) wherein said queries to said directory service proxy server are passed by a secure connection service between said a directory service query service and said remote directory service, wherein said directory service proxy server communicates directly with said internal directory service to obtain query responses from said directory service proxy server provided by said internal directory service; and
c) said secure connection service further configured to return said query responses from the directory service proxy server via said remote directory service to said application, wherein said accepting, passing and returning enable said application to interact with said internal directory services through said directory service proxy server, said secure connection service and said remote directory service.

2. The system defined by claim 1 further comprising a plurality of said directory service proxy servers, wherein said remote directory service assigns a directory service proxy identifier to each said directory service proxy server which is registered with said remote directory service, and determines to which directory service proxy server queries should go based on said directory service proxy identifier.

3. The system defined by claim 1 wherein said remote directory service includes an application programming interface for receiving application directory service query types offered by said internal directory service.

4. The system defined by claim 3 wherein said application directory service query types include at least user authentication queries and user permission queries.

5. The system defined by claim 1 wherein said remote directory service includes an application programming interface that defines a non-destructive subset of directory service queries.

6. The system defined by claim 1 wherein said remote directory service receives a security certificate and key from said application, said security certificate and key provided by said directory service proxy server.

7. The system defined by claim 6 wherein said directory service proxy server refuses any directory service requests without said security certificate and key.

8. A system for providing secure access to an organization's internal directory service from external hosted services comprising:
a memory having instructions executed by a processor to implement:
a directory service proxy server inside a firewall of said organization configured to communicate with a remote directory service via a secure connection service to pass requests from said remote directory service originating from an application running on said external hosted services to said internal directory service which is a directory service inside said firewall and send request responses from said internal directory service to said remote directory service for said application via said secure connection service;
wherein said remote directory service is further configured to accept a validation protocol from said application, said validation protocol provided by said directory service proxy server; and
said directory service proxy server communicating directly with said internal directory service to obtain responses to said requests from said internal directory service and pass said requests to said internal directory service; and
said query request responses from the directory service proxy server are returned to said application via said secure connection service and said remote directory service, wherein said passing, accepting and returning enable said application to interact with said internal directory service through said directory service proxy server, said secure connection service and said remote directory service.

9. The system defined by claim 8 wherein said directory service proxy server queries said internal directory service with directory service query types offered by said internal directory service.

10. The system defined by claim 8 wherein said directory service proxy server provides a security certificate and key for said application to provide when requesting a directory service.

11. The system defined by claim 10 wherein said directory service proxy server refuses any directory service requests without said security certificate and key.

* * * * *